(12) United States Patent
Topper

(10) Patent No.: US 6,281,464 B1
(45) Date of Patent: Aug. 28, 2001

(54) PROCESS AND APPARATUS FOR WELDING A HOLLOW STRUCTURE, SUCH AS A CONTAINER OR A TUBE, WITH INERTING OF ITS INTERNAL STRUCTURE

(75) Inventor: Des Topper, Port Elisabeth (ZA)

(73) Assignee: L'Air Liquide, Societe Anonyme pour l'Etude et l'Exploitation des Procedes Georges Claude, Paris (FR)

( * ) Notice: Subject to any disclaimer, the term of this patent is extended or adjusted under 35 U.S.C. 154(b) by 0 days.

(21) Appl. No.: 09/425,975

(22) Filed: Oct. 25, 1999

(30) Foreign Application Priority Data

Oct. 23, 1998 (ZA) .................................................. 98-9702

(51) Int. Cl.[7] .................................................. B23K 9/173
(52) U.S. Cl. .......................... 219/75; 219/75; 219/137 R; 228/219
(58) Field of Search .......................... 219/74, 75, 137 R, 219/61; 228/42, 219

(56) References Cited

U.S. PATENT DOCUMENTS

| | | |
|---|---|---|
| 2,259,976 | 10/1941 | Howard . |
| 4,296,300 | * 10/1981 | Bottiglia .......................... 219/137 R |
| 4,454,405 | * 6/1984 | Riley ...................................... 219/61 |
| 4,828,160 | * 5/1989 | Sundholm .............................. 219/74 |
| 5,484,973 | 1/1996 | Gittens et al. . |

FOREIGN PATENT DOCUMENTS 195 06 477    8/1996   (DE) .

* cited by examiner

Primary Examiner—Clifford C. Shaw
(74) Attorney, Agent, or Firm—Young & Thompson

(57) ABSTRACT

First and second sub-parts are brought into contact with each other so as to form an unwelded hollow structure defining an internal volume. The internal volume of the hollow structure is inerted by introducing an inerting gas mixture into the hollow structure, the inerting gas mixture comprising from 93% to 99.8% nitrogen and from 0.2% to 7% oxygen and being produced by air permeation by means of one or more membrane modules. The first and second sub-parts are arc welded together so as to form a welded hollow structure.

20 Claims, 1 Drawing Sheet

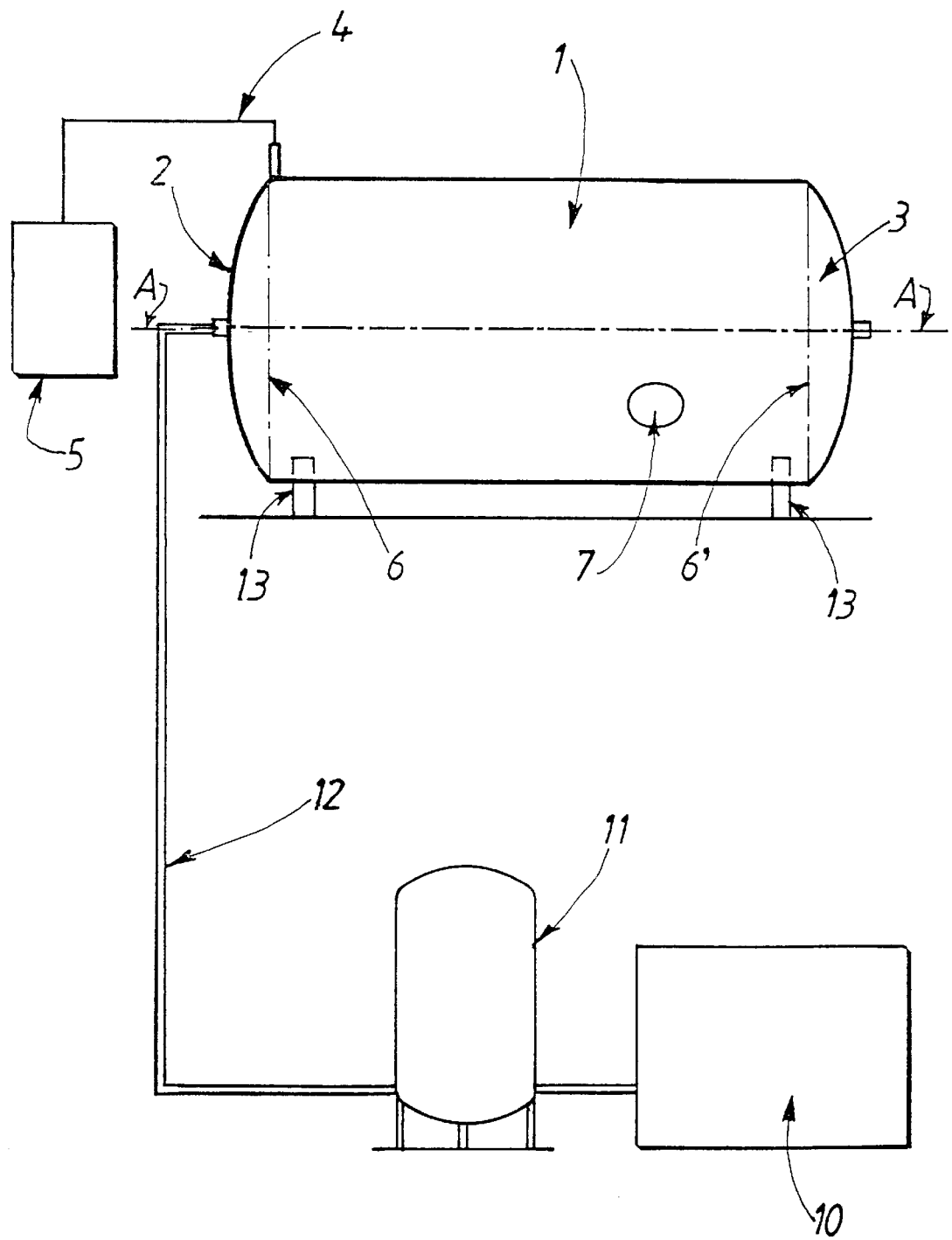

PROCESS AND APPARATUS FOR WELDING A HOLLOW STRUCTURE, SUCH AS A CONTAINER OR A TUBE, WITH INERTING OF ITS INTERNAL STRUCTURE

FIELD OF THE INVENTION

The present invention relates to the field of the manufacture of large metal structures, in particular the manufacture of metal containers or tubes, the said sub-parts of which are joined together by arc welding, especially by TIG welding or by plasma welding.

BACKGROUND OF THE INVENTION

Conventionally, a large hollow structure, i.e. a structure having a diameter and/or a length which may be as much as several meters, such as a container, comprises several sub-parts welded together, namely, in general, a main part forming the central body of the container and two end parts each fastened to one end of the said container body by welding.

In other words, in the case of a container, the two ends of the container are welded to the body of the container by implementing a welding process, for example an automatic plasma welding process, in which the welding torch is located outside the container and the container itself being rotated about its axis, so as to produce a uniform weld around the entire periphery or circumference of the said container, all along the mating plane defined by the junction of the two sub-parts to be welded to each other.

Alternatively, it is also possible to keep the parts to be welded stationary and to move the welding torch or torches around the parts to be welded.

In the case of the manufacture of metal tubes, the sub-parts of a tube are in fact, in the context of the present invention, the two opposed longitudinal edges of the same metal sheet or plate, these edges being brought into contact with each other (forming a "U" and then an "O") before being welded together into a "gastight" tube.

In other words, in the context of the invention, the sub-parts may belong to the same piece (in the case of a tube) or to separate structures (in the case of a container) which have to be brought together, one into contact with the other.

In practice, it has been observed that, during the welding operation, that part of the weld joint located on the opposite side from the weld, i.e. on the inside of the volume defined by the container or the tube, is very sensitive to oxidation when the metal is still molten or at high temperature.

It is therefore necessary, throughout the welding operation, to shield the weld joint while it is being produced by providing a gas shield not only on the outside but also on the inside of the tube or of the said container.

To do this, the air inside the container or the tube must be purged and replaced by an inert or neutral atmosphere which is more or less free of oxygen.

For this purpose, it is common practice to use argon or nitrogen coming from a cryogenic production source used for producing cryogenic fluids, especially nitrogen and argon, with a purity conventionally greater than 99.9%, for example a cryogenic distillation unit.

After the nitrogen or argon has been produced by cryogenic distillation, it is held in storage and transportation containers, such as gas bottles, and then subsequently taken to the site where it will be used by a suitable transportation means, such as a lorry.

However, using nitrogen or argon produced by cryogenic distillation and then taken to the site where it will be used, i.e. the welding site, has a certain number of drawbacks, especially because it requires:

strict monitoring of what is in stock and what is being delivered, in order to avoid any lack of product on the site of use;

tight control of the production and delivery costs in order to minimize their impact on the final cost of the end-product, i.e. the welded tube or container; and a site for storing the gas bottles not yet used.

SUMMARY OF THE INVENTION

The object of the present invention is therefore to provide a process and an apparatus for manufacturing a large structure having a hollow internal body, such as a container or a tube, which do not have the aforementioned drawbacks.

Another object of the invention is to provide a process for welding the sub-units of such a large structure, which employs a gas mixture for inerting the internal part of the said structure, this gas mixture being intended to shield that part of the weld joint located inside the said structure, and which can be carried out directly on the welding site.

The present invention therefore relates to a process for arc-welding at least a first sub-part with at least a second sub-part into a hollow structure defining an internal volume, the said first and second sub-parts being made of a metal or a metal alloy, in which:

at least the first and second sub-parts are brought into contact with each other so as to form an unwelded hollow structure defining an internal volume;

at least part of the said internal volume of the said hollow structure is at least partially inerted by introducing an inerting gas mixture into the said hollow structure, the said inerting gas mixture comprising from 93% to 99.8% nitrogen and from 0.2% to 7% oxygen; and the said first and second sub-parts are welded together so as to form a welded hollow structure, for example a container or a tube.

Depending on the case, the welding process may comprise one or more of the following characteristics:

the inerting gas mixture comprises from 95% to 99.7% nitrogen and from 0.3% to 5% oxygen and preferably the inerting gas mixture comprises from 97.5% to 99.6% nitrogen and from 0.4% to 2.5% oxygen, preferably about 2% oxygen and the balance being essentially nitrogen;

the inerting gas mixture furthermore comprises gaseous impurities chosen from argon, carbon dioxide, carbon monoxide and water vapour, the total content of the said impurities preferably being less than 0.5%;

the inerting gas mixture is produced from air separated by permeation, the inerting gas mixture preferably being produced on site and introduced into the internal volume of the said hollow structure;

the separation of the air by permeation is carried out by means of at least one membrane or of at least one permeation membrane module and the inerting gas mixture is recovered on the rententate side of at least the said membrane or of the said membrane module;

before starting to inert the internal volume of the hollow structure, the internal volume of the hollow structure is substantially hermetically sealed;

the inerting operation is carried out at least before the start of welding by gradually replacing the ambient air contained in the hollow structure with the inerting gas mixture, the inerting operation preferably being continued throughout the duration of the welding;

the inerting gas mixture is introduced into the hollow structure at a pressure of between $5 \times 10^5$ Pa and $10^6$ Pa, preferably of the order of $8.5 \times 10^5$ Pa approximately;

throughout the duration of the welding of the first and second sub-parts to each other, a pressure of less than $5 \times 10^5$ Pa, preferably between $2 \times 10^5$ Pa and $3 \times 10^5$ Pa approximately, is maintained inside the hollow structure;

the arc welding is plasma welding or TIG welding or a TIG-plasma combination;

the first and second sub-parts are sub-parts of a container, preferably the first sub-part forms at least one part of the central shell of the container and the second sub-part is an end element of the container;

the first and second sub-parts form a metal tube, the first and second sub-parts forming the longitudinal edges of a single metal plate or sheet, which edges are brought into contact with other (forming a "U" and then an "O") and then welded together so as to obtain a hollow metal tube.

Furthermore, the invention also relates to an apparatus for arc-welding at least a first sub-part with at least a second sub-part into a hollow structure defining an internal volume, the said first and second sub-parts being made of a metal or of a metal alloy, comprising:

holding means allowing at least the said first and second sub-parts to be brought into contact with each other and held together so as to form an unwelded hollow structure defining an internal volume;

inerting means allowing at least part of the said internal volume of the said hollow structure to be at least partially inerted by introducing an inerting gas mixture into the said hollow structure, the said inerting means including:

permeation means comprising one or more permeation membranes or membrane modules producing an inerting gas mixture comprising from 90 to 99.8% nitrogen and from 0.2 to 10% oxygen from air;

inerting-gas supply means allowing the said inerting gas mixture to be introduced into the said hollow structure; and welding means including at least one arc-welding torch, preferably of the plasma and/or TIG type, allowing at least the first and second sub-parts to be welded together so as to form a welded hollow structure.

Preferably, the apparatus furthermore includes rotary means allowing the hollow structure or the welding torch to be rotated during at least part of the welding period.

According to a preferred embodiment of the invention, the hollow structure is a container, the said first sub-part and the said second sub-part forming, respectively at least one part of the central shell of the container and at least one end element of the container.

According to another aspect, the hollow structure is a hollow metal tube.

In the context of the present invention, "air" should be understood to mean the ambient air, optionally pretreated, for example prepurified of one or more impurities or dried, or the ambient atmospheric air untreated.

The treated or untreated air then undergoes several permeation steps so as to produce the inerting mixture according to the invention directly on the welding site.

The process of the invention may also be used to manufacture metal tubes from a metal sheet or plate, the two longitudinal edges of which are brought into contact with each other and then welded together. In this case, the two sub-parts to be welded are the opposed longitudinal edges belonging to the same metal plate.

The invention will now be described in greater detail with the aid of an embodiment illustrated in the appended FIGURE, which is given by way of illustration but implies no limitation.

BRIEF DESCRIPTION OF THE DRAWING

The appended FIGURE shows the diagram of a welding apparatus according to the present invention.

DETAILED DESCRIPTION OF THE PREFERRED EMBODIMENT

The FIGURE shows a large structure, namely in this case a container, having a central body 1 of cylindrical shape and two end parts 2 and 3 fastened to the central body 1 by welding, for example by plasma welding or TIG (Tungsten Inert Gas) welding.

The welding is carried out by means of an automatic TIG or plasma torch 4 controlled by a welding machine 5 (not detailed).

In some cases, it is possible or desirable to use several torches 4 of the same type, for example 2 or 3 TIG torches, or of different type, for example a TIG torch in combination with a plasma torch.

In order to produce the weld joint 6 around the entire periphery of the container 1, the central body 1 and part of the end 2 are brought into contact with each other so as to form an unwelded hollow structure defining an internal volume.

Next, the central part 1 of the container is held in contact with the end 2 by tack welding.

Next, the internal part of the hollow structure is inerted by injecting an inerting gas mixture into it so as to expel the atmospheric air therein, and therefore to expel most of the oxygen liable to contaminate the weld joint thus produced.

While one of the ends of the container is being welded to an end part 2 or 3, the other part of the container, not yet welded, is closed by means of tack welding and/or, if required, with the aid of gastight sealing means in order to prevent the atmospheric air entering it and therefore to prevent the inerting gas leaving it.

Removal of the atmospheric air contained inside the container may be accomplished by means of a vent or purge hole 7 via which the air/gas purge mixture is removed and discharged into the atmosphere or, if required, recovered in order to be recycled.

The inerting gas mixture or purge gas preferably comprises from 90% to 99.8% nitrogen and at most 7% oxygen, generally at most of the order of approximately 2% oxygen.

According to the invention, the inerting gas mixture is manufactured directly on the site of use from ambient air preseparated by permeation by means of a permeation separation unit 10, such a membrane separation unit sold by L'Air Liquide under the name FLOXAL™.

Collected from this permeation air-separation unit is an inerting gas mixture which may be piped directly into the container 1 or, if required, stored in a buffer tank 11 for the purpose of using it later, or indeed, if necessary, subjecting it later to further purification.

During the welding operation, the container is given a rotational motion about its axis (AA) so as to be able to produce a weld 6 all around its periphery.

The rotational motion is obtained by means of a rotation system 13, for example [lacuna].

After welding the first end part 2 to the first end of the body 1 of the container, the second end part 3 is welded in the same way to the other end of the body 1 of the container.

As a variant, instead of welding the end parts 2 and 3 to each other, as explained above, it is also possible to weld the two end parts 2 and 3 to the central body 1 of the container at the same time. In this case, at least two welding torches will be used to produce the two welds 6 and 6' simultaneously, the said torches then operating in parallel.

The inerting gas mixture produced by the air separation unit 10 is introduced into the container at a given pressure of the order of, for example, $8.5 \times 10$ Pa for a defined time, for example for approximately 12 minutes.

After the initial purging operation, the pressure inside the container is maintained at a value of between $2 \times 10^5$ Pa and $3 \times 10^5$ Pa inside the container, for example by the addition of an influx of nitrogen coming, for example, from the buffer tank 11, and is maintained more or less throughout the welding operation, thereby keeping an oxygen concentration inside the internal volume of the container 1 of the order or approximately 2%, or even of less than 2%.

Welds produced on containers manufactured according to the process of the invention have properties which are quite acceptable from the standpoint of tensile strength, corrosion resistance, nitrogen content in the deposited metal, recoloration, oxidation, porosity and penetration, as demonstrated by analytical tests carried out on welded joints produced by implementation of the process according to the invention.

The process according to the invention may be applied to the welding of any type of container, such as storage silos, vessels, tanks or the like, or, in a similar manner, to the manufacture of tubes from metal sheets or plates, the longitudinal edges of which are welded together.

It should be noted that the process according to the invention is particularly suitable for welding austenitic stainless steel.

What is claimed is:

1. Process for arc-welding at least a first sub-part with at least a second sub-part into a hollow structure defining an internal volume, the first and second sub-parts being made of a metal or a metal alloy, comprising the steps of:
   bringing at least the first and second sub-parts into contact with each other so as to form an unwelded hollow structure defining an internal volume;
   inerting at least part of the internal volume of the hollow structure by introducing an inerting gas mixture into the hollow structure, the inerting gas mixture comprising from 93% to 99.8% nitrogen and from 0.2% to 7% oxygen; and
   arc welding the first and second sub-parts together so as to form a welded hollow structure.

2. Process according to claim 1, wherein the inerting gas mixture comprises from 95% to 99.7% nitrogen and from 0.3% to 5% oxygen.

3. Process according to claim 2, wherein the inerting gas mixture comprises from 97.5% to 99.6% nitrogen and from 0.4% to 2.5% oxygen.

4. Process according to claim 1, wherein the inerting gas mixture furthermore comprises gaseous impurities chosen from argon, carbon dioxide, carbon monoxide and water vapour, the total content of the impurities being less than 0.5%.

5. Process according to claim 1, wherein the inerting gas mixture is produced on site from air separated by permeation.

6. Process according to claim 5, wherein the separation of the air by permeation is carried out by means of at least one permeation membrane or of at least one permeation membrane module.

7. Process according to claim 1, further comprising, before starting the inerting step, hermetically sealing the internal volume of the hollow structure.

8. Process according to claim 1, wherein the inerting step comprises gradually replacing the ambient air contained in the hollow structure with the inerting gas mixture before the start of the welding step.

9. Process according to claim 1, wherein the inerting gas mixture is introduced into the hollow structure at a pressure of between $5 \times 10^5$ Pa and $10^6$ Pa.

10. Process according to claim 9, wherein the pressure is approximately $8.5 \times 10^5$ Pa.

11. Process according to claim 1, wherein throughout the welding step, maintaining a pressure of less than $5 \times 10^5$ Pa inside the hollow structure.

12. Process according to claim 11, wherein the pressure is between $2 \times 10^5$ Pa and $3 \times 10^5$ Pa.

13. Process according to claim 1, wherein the arc welding comprises plasma welding, TIG welding or a TIG-plasma combination.

14. Process according to claim 1, wherein the first and second sub-parts comprises sub-parts of a container.

15. Process according to claim 14, wherein the first sub-part comprises at least one part of the central shell of the container and the second sub-part comprises an end element of the container.

16. Process according to claim 1, wherein the first and second sub-parts consist of the longitudinal edges of a metal sheet or plate, the longitudinal edges being brought into contact with each other and then welded together so as to form a metal tube defining a hollow internal volume.

17. Apparatus for arc-welding at least a first sub-part with at least a second sub-part into a hollow structure defining an internal volume, the first and second sub-parts being made of a metal or of a metal alloy, comprising:
   holding means allowing at least the first and second sub-parts to be brought into contact with each other and held together so as to form an unwelded hollow structure defining an internal volume;
   inerting means allowing at least part of the internal volume of the hollow structure to be at least partially inerted by introducing an inerting gas mixture into the hollow structure, said inerting means including:
      permeation means comprising one or more permeation membranes producing an inerting gas mixture comprising from 90 to 99.8% nitrogen and from 0.2 to 10% oxygen from air;
      inerting-gas supply means allowing the inerting gas mixture to be introduced into the hollow structure; and
   welding means including at least one arc-welding torch, allowing at least the first and second sub-parts to be welded together so as to form a welded hollow structure.

18. Apparatus according to claim 17, further comprising rotary means allowing the hollow structure OT least one torch to be rotated during at least part of the welding period.

19. Apparatus according to claim 18, wherein the hollow structure is a container, the first sub-part and the second sub-part forming, respectively, at least one part of the central shell of the container and at least one end element of the container.

20. Apparatus according to claim 17, wherein the arc-welding torch comprises a plasma torch, a TIG torch, or a plasma torch in combination with a TIG torch.

* * * * *